United States Patent
Yang

(10) Patent No.: US 8,188,706 B2
(45) Date of Patent: May 29, 2012

(54) POWER MANAGEMENT UNIT WITH BATTERY DETECTION CONTROLLER AND SWITCHABLE REGULATOR BLOCK

(75) Inventor: Ken Guo Chi Yang, Tustin, CA (US)

(73) Assignee: Broadcom Corporation, Irvine, CA (US)

( * ) Notice: Subject to any disclaimer, the term of this patent is extended or adjusted under 35 U.S.C. 154(b) by 656 days.

(21) Appl. No.: 12/001,353

(22) Filed: Dec. 10, 2007

(65) Prior Publication Data

US 2008/0197707 A1    Aug. 21, 2008

Related U.S. Application Data

(60) Provisional application No. 60/901,836, filed on Feb. 16, 2007.

(51) Int. Cl.
*H02J 7/00* (2006.01)
(52) U.S. Cl. ........................... 320/107
(58) Field of Classification Search .......... 320/107
See application file for complete search history.

(56) References Cited

U.S. PATENT DOCUMENTS

| | | | |
|---|---|---|---|
| 4,644,437 A * | 2/1987 | Robe | 361/56 |
| 5,600,224 A * | 2/1997 | Mody et al. | 320/106 |
| 5,945,803 A * | 8/1999 | Brotto et al. | 320/106 |
| 6,075,343 A * | 6/2000 | Hsu | 320/134 |
| 6,208,115 B1 | 3/2001 | Binder | |
| 2002/0047685 A1* | 4/2002 | Perelle | 320/119 |
| 2005/0151505 A1* | 7/2005 | Dias et al. | 320/106 |
| 2007/0182366 A1* | 8/2007 | Lee | 320/107 |

OTHER PUBLICATIONS

*Fully Integrated Switch-Mode One-Cell Li-Ion Charger with Full USB Compliance and USB-OTG Support*, Texas Instruments, SLUS824 (Jun. 2008).

* cited by examiner

*Primary Examiner* — Arun Williams
(74) *Attorney, Agent, or Firm* — Farjami & Farjami LLP

(57) ABSTRACT

According to one exemplary embodiment, a power management unit residing in an electronic device includes a battery detection controller coupled to a battery charger and a regulator block, where the regulator block is capable of providing power to the electronic device. The battery detection controller is configured to turn off the regulator block when the battery charger is coupled to an external power source and is not coupled to a battery of the electronic device. The battery detection controller can be further configured to turn on the regulator block when the battery charger is coupled to the external power source and is coupled to the battery if the battery has a battery voltage greater than a threshold voltage.

48 Claims, 5 Drawing Sheets

POWER MANAGEMENT UNIT WITH BATTERY DETECTION CONTROLLER AND SWITCHABLE REGULATOR BLOCK

The present application claims the benefit of and priority to a pending provisional patent application entitled "Battery Detection Circuit and Method," Ser. No. 60/901,836 filed on Feb. 16, 2007. The disclosure in that pending provisional application is hereby incorporated fully by reference into the present application.

BACKGROUND OF THE INVENTION

1. Field of the Invention

The present invention generally relates to the field of electrical circuits and systems. More particularly, the invention relates to circuits and systems utilizing a battery and/or a battery charger.

2. Background Art

A battery-powered electronic device, such as a cellular phone, a laptop computer, or an MP3 player, typically includes a power management unit (PMU) coupled to a battery. The PMU can include a battery charger and a number of voltage regulators for providing regulated power to the electrical circuits in the electronic device. In a conventional PMU, as soon as an external power source, such as a USB port on a computer or an AC power adapter, is coupled to the battery charger input of the PMU, the battery charger in the PMU will start to charge the battery and a capacitor that is coupled to the battery input of the PMU. When the battery has been charged to a voltage greater than a threshold voltage, the voltage regulators in the PMU are turned on, thereby providing power to the electronic device.

However, if a battery is not installed in the electronic device when the battery charger input of the PMU is connected to the external power source, the PMU battery charger will begin charging the capacitor that is coupled to the battery input of the PMU. When the capacitor voltage exceeds a threshold voltage, the regulators in the PMU are turned on, which turns on the electronic device. However, if the current drawn by the electronic device exceeds the limited charging current provided by the PMU battery charger, the voltage across the capacitor will drop below the threshold voltage, thereby causing voltage regulators in the PMU and, consequently, the electronic device to turn off.

When the voltage regulators in the PMU are turned off, the current drawn from the battery charger is reduced, thereby causing the capacitor voltage to rise above the threshold voltage and cause the PMU regulators and, consequently, the electronic device to turn back on. The undesirable on/off cycles can continue to repeat as long as a battery is not installed in the electronic device and the charger input of the conventional PMU is connected to an external power source. Among other problems, the undesirable on/off cycles can degrade a user's experience using the electronic device.

SUMMARY OF THE INVENTION

A power management unit with battery detection substantially as shown in and/or described in connection with at least one of the figures, as set forth more completely in the claims.

DETAILED DESCRIPTION OF THE INVENTION

The present invention is directed to a power management unit with battery detection. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings.

Figure 1:
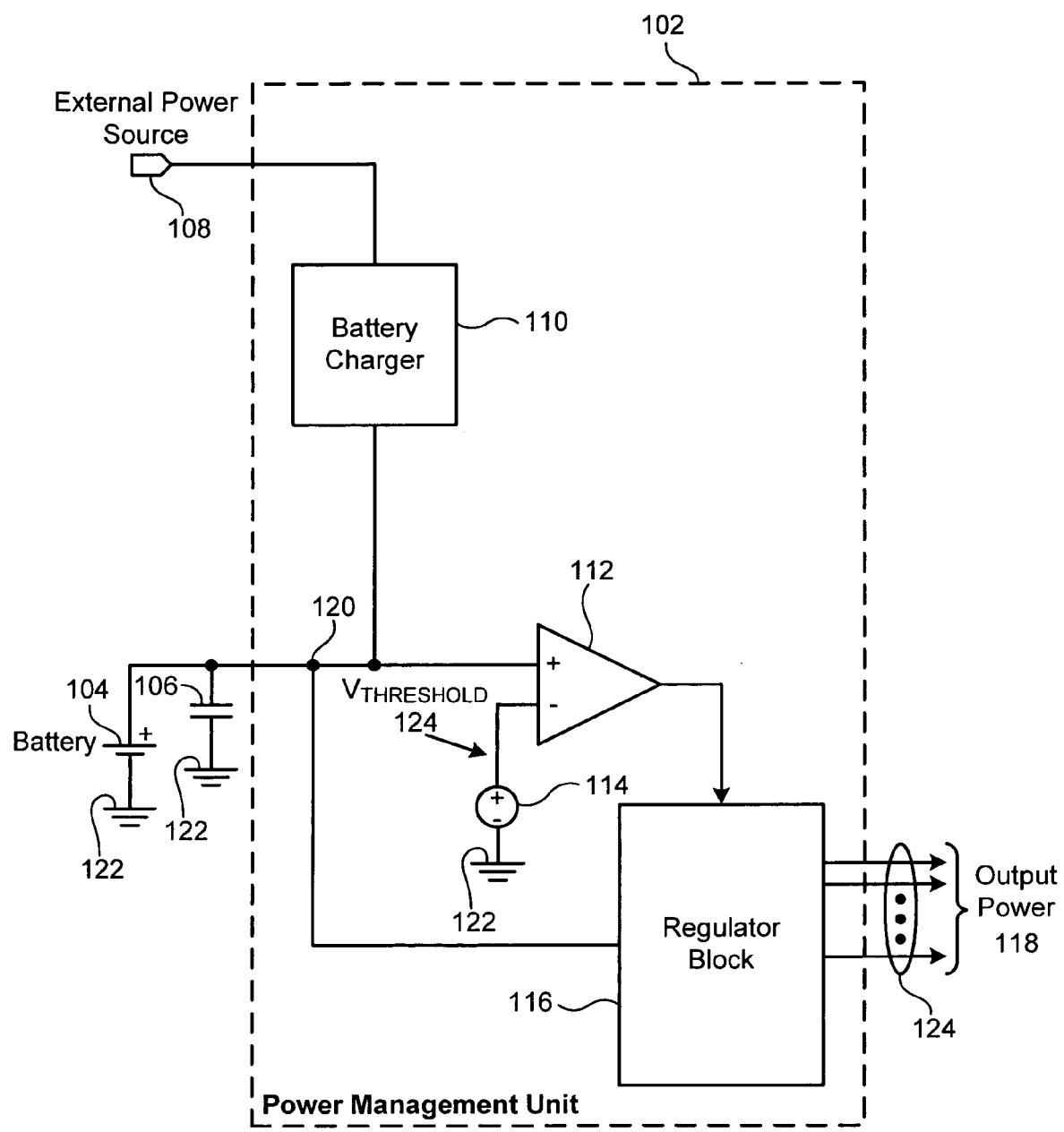
FIG. 1 shows a diagram of a conventional exemplary PMU (power management unit) for providing power to an electronic device.

FIG. 1 shows a block diagram of conventional PMU 102 coupled to a battery, a capacitor, and an external power source. Conventional PMU 102, which is coupled to battery 104, capacitor 106, and external power source 108, includes battery charger 110, comparator 112, voltage source 114, and regulator block 116. Conventional PMU 102 can reside in an electronic device (not shown in FIG. 1) which can be powered by a battery, such as a cellular phone, personal digital assistant (PDA), laptop computer, or MP3 player. Conventional PMU 102 can be configured to supply output power 118 to the electronic device in which it (i.e. conventional PMU 102) resides, thereby enabling the electronic device to turn on.

As shown in FIG. 1, external power source 108 can be coupled to the input of battery charger 110 at the charger input of conventional PMU 102. External power source 108 can be a USB port on a computer, an AC power adapter that can provide a DC output voltage, or other suitable source of power for battery charger 110. When coupled to external power source 108, battery charger 110 can provide a charging voltage of, for example, approximately 4.2 volts, which can be utilized to charge battery 104 and capacitor 106. Battery charger 110 can include a charger detect circuit (not shown in FIG. 1) for detecting when battery charger 110 is coupled to an external power source, such as external power source 108.

Also shown in FIG. 1, the output of battery charger 110 is coupled to the positive (non-inverting) input of comparator 112, the positive terminal of battery 104, the supply voltage input of regulator block 116, and a first terminal of capacitor 106 at node 120, which can also be referred to as the "battery input" of conventional PMU 102. Battery 104, which can be installed and coupled to the battery input of conventional PMU 102 in an electronic device, can be, for example, a lithium ion battery. Battery charger 110 can be configured to charge battery 104 and capacitor 106 when it (i.e. battery charger 110) is coupled to external power source 108. Further shown in FIG. 1, the negative terminal of battery 104 and a second terminal of capacitor 106 are coupled to ground 122, the positive terminal of voltage source 114 is coupled to the negative (inverting) input of comparator 112, and the negative terminal of voltage source 114 is coupled to ground 122, and the output of comparator 112 is coupled to the control input of regulator block 116.

Voltage source 114 provides threshold voltage ($V_{THRESHOLD}$) 124, which is an under voltage lockout (UVLO) threshold. $V_{THRESHOLD}$ 124 can be, for example, approximately 3.2 volts. Comparator 112, which can be an operational amplifier, can be configured to compare the voltage applied to the positive input of the comparator, i.e., the voltage at node 120, with $V_{THRESHOLD}$ 124 and to provide a regulator control signal that can turn on, i.e., activate, regulator block 116 when the voltage at node 120, which is coupled to the positive input of comparator 112, is greater than $V_{THRESHOLD}$ 124. Regulator block 116 can include a number of voltage regulators, such as DC-DC converters and low dropout (LDO) voltage regulators. Regulator block 116 can be configured to provide output power 118 via lines 124 when it (i.e. regulator block 116) is activated by the regulator control signal outputted by comparator 112.

The operational of conventional PMU 102 will now be discussed for a configuration in which conventional PMU 102 and capacitor 106 reside in an electronic device, such as a cellular phone. When battery 104 is installed in the electronic device and coupled to the battery input of conventional PMU 102 and the input of battery charger 110 is coupled to external power source 108, battery charger 110 begins to charge battery 104 and capacitor 106 at node 120. When the voltage at node 120 is greater than $V_{THRESHOLD}$ 124, a regulator control signal outputted by comparator 112 turns on regulator block 116, which provides output power 118 to the electrical circuits in the electronic device.

However, if battery 104 is not installed in the electronic device and, therefore, not coupled to node 120 and the input of battery charger 110 is coupled to external power source 108, battery charger 110 immediately begins to charge capacitor 106, which has a much smaller charge storage capacity than battery 104. When capacitor 106 is charged to a voltage that exceeds $V_{THRESHOLD}$ 124, the output of comparator 112 will cause regulator block 116 to turn on and provide output power 118 to the electronic device. However, battery charger 110 typically provides a limited charging current, which can be, for example, as low as 100.0 milliamperes (mA). Thus, if battery 104 is not installed in the electronic device and the supply current drawn by the electronic device exceeds the limited charging current, the voltage at node 120 can drop below $V_{THRESHOLD}$ 124, thereby causing the regulator control signal outputted by comparator 112 to turn off regulator block 116.

After regulator block 116 has turned off, the current drawn by regulator block 116 at node 120 is reduced, which causes capacitor 106 to be charged to a voltage at node 120 that is greater than $V_{THRESHOLD}$ 124. As a result, comparator 112 causes regulator block 116 to turn on and supply output power 118 to the electronic device. In conventional PMU 102, the on/off power cycle discussed above can continue to repeat as long as battery 104 is not installed in the electronic device and the charger input of conventional PMU 102 is connected to external power source 108, which is undesirable and annoying to an end user of the electronic device.

Figure 2:
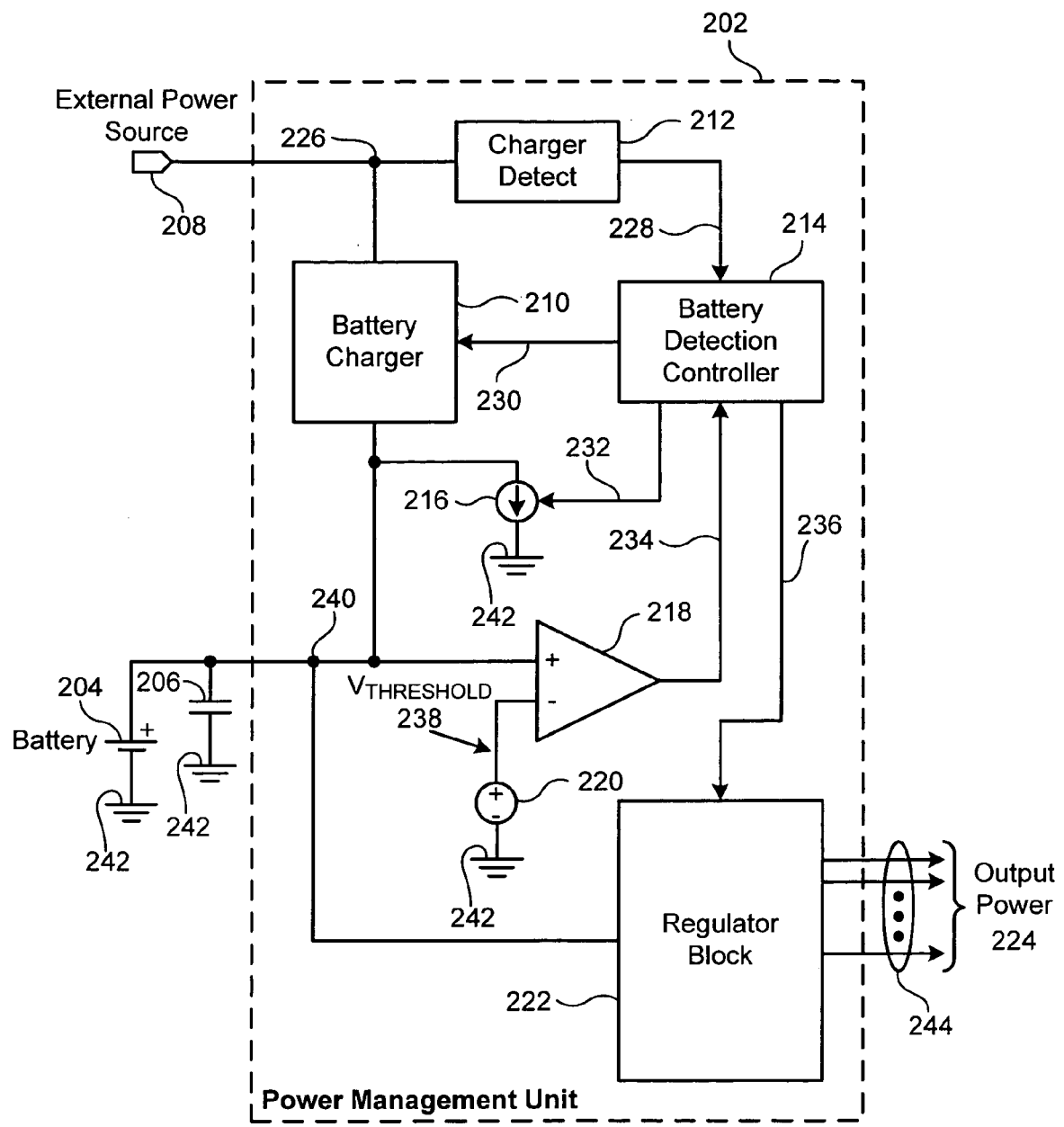
FIG. 2 shows a diagram of an exemplary PMU for providing power to an electronic device in accordance with one embodiment of the present invention.

FIG. 2 shows a block diagram of PMU 202 coupled to a battery, a capacitor, and an external power source in accordance with one embodiment of the present invention. PMU 202, which is coupled to battery 204, capacitor 206, and external power source 208, includes battery charger 210, charger detect 212, battery detection controller 214, current sink 216, comparator 218, voltage source 220, and regulator block 222. PMU 202 can be fabricated in a semiconductor die and can reside in an electronic device (not shown in FIG. 2) which can be battery-powered, such as a cellular phone, PDA, laptop computer, or an MP3 player. PMU 202 can be configured to provide output power 224 to the electronic device in which PMU 202 resides so as to enable the electronic device to turn on.

As shown in FIG. 2, external power source 208 can be coupled to the input of battery charger 210 and the input of charger detect 212 at node 226, which is also referred to as the "charger input" of PMU 202. External power source 208 can be a USB port on a computer, an AC power adapter that can provide a DC output voltage, such as 5.0 volts, or other suitable source of power for battery charger 210. When battery 204 and external power source 208 are coupled to PMU 202 and battery charger 210 is activated by battery detection controller 214, battery charger 210 can configured to provide a charging voltage, such as a charging voltage of approximately 4.2 volts, for charging battery 204 and capacitor 206. Also shown in FIG. 2, the output of charger detect 212 is coupled to an input of battery detection controller 214 via line 228. Charger detect 212 can be configured to notify battery detection controller 214 via an appropriate signal on line 228 when charger detect 212 detects that an external power source, such as external power source 208, is coupled to the charger input of PMU 202 at node 226.

Further shown in FIG. 2, the outputs of battery detection controller 214 are coupled to inputs of battery charger 210, current sink 216, and regulator block 222 via respective lines 230, 232, and 236, and an input of battery detection controller 214 is coupled to the output of comparator 218 via line 234. Battery detection controller 214 can comprise, for example, a microcontroller, and can be configured to determine if battery charger 210 is coupled to a battery (e.g. battery 204) at the battery input of PMU 202 and to determine if battery charger 210 is coupled to an external power source (e.g. external power source 208) at the charger input of PMU 202, and to turn off regulator block 222 if battery charger 210 is coupled an external power source and is not coupled to a battery.

Battery detection controller 214 can also be configured to turn on regulator block 222 when it (i.e. battery detection controller 214) determines that battery charger 2 10 is coupled to a battery and that the battery is charged to a voltage greater than threshold voltage ($V_{THRESHOLD}$) 238, which is provided by voltage source 220. Battery detection controller 214 can be further configured to turn on current sink 216 via a discharge control signal on line 232 so as to discharge capacitor 206 and to turn on battery charger 210 via a charger control signal on line 230. Battery detection controller 214 can be further configured to determine if the output of comparator 218 is at a low voltage level or a high voltage level by sampling the output of comparator 218 on line 234.

Also shown in FIG. 2, the output of battery charger 210, the supply input of regulator block 222, the positive terminal of battery 204, a first terminal of capacitor 206, and a first terminal of current sink 216 are coupled the positive (non-inverting) input of comparator 218 at node 240, which can also be referred to as the "battery input" of PMU 202. Current sink 216 can be configured to discharge capacitor 206 when activated by a discharge control signal outputted by battery detection controller 214 on line 232, which is coupled to the control input of current sink 216. Battery 204 can be a lithium ion battery or other suitable type of rechargeable battery and can be installed and coupled to node 240 (i.e. the battery input of PMU 202) in an electronic device, such as a cellular phone, in which PMU 202 resides. Capacitor 206 and PMU 202 can reside on, for example, a system circuit board in the electronic device.

Further shown in FIG. 2, a first terminal of voltage source 220 is coupled to the negative (inverting) input of comparator 218 and the negative terminal of battery 204 and second terminals of capacitor 206, current sink 216, and voltage source 220 are coupled to ground 242. Voltage source 220 can provide a threshold voltage (i.e. $V_{THRESHOLD}$ 238), which is a UVLO (under voltage lockout) threshold, at the negative input of comparator 218. $V_{THRESHOLD}$ 238 can be, for example, approximately 3.2 volts. However, $V_{THRESHOLD}$ 238 may also be less than or greater than 3.2 volts. Comparator 218, which is a UVLO comparator, can be, for example, an operational amplifier and can be configured to output a high voltage level on line 234 when the voltage at the positive input, which is coupled to node 240, is greater than the voltage (i.e. $V_{THRESHOLD}$ 238) at the negative input and to output a low voltage level on line 234 when the voltage at the negative input is equal to or greater than the voltage at the positive input.

Also shown in FIG. 2, the supply input of regulator block 222 is coupled to node 240 and the control input of regulator block 222 is coupled to an output of battery detection controller 214 via line 236. Regulator block 222 can comprise a number of voltage regulators, such as DC-DC converters and LDO voltage regulators and can be configured to provide output power 224 on lines 244 when it (i.e. regulator block 222) is turned on (i.e. activated) by a regulator control signal provided by battery detection controller 236 on line 236. For example, regulator block 222 can be turned on when the regulator control signal is at a high voltage level and can be turned off when the regulator control signal is at a low voltage level.

PMU 202 can be coupled to the electrical circuits in an electronic device (not shown in FIG. 2), such as a cellular telephone, via lines 244. When regulator block 222 is turned on by battery detection controller 214, regulator block 222 can provide output power 224 to the electrical circuits in the electronic device, thereby enabling the electronic device to turn on. In PMU 202, battery detection controller 214 does not turn on regulator block 222 when battery charger 210 is coupled to an external power source, such as external power source 208, and battery charger 210 is not coupled to a battery, such as battery 204.

Thus, by detecting when battery charger 210 is coupled to an external power source and not coupled to a battery, and by not providing output power 224 to an electronic device when battery charger 210 is coupled to the external power source and is not coupled to the battery, the invention's PMU 202 advantageously avoids the on/off cycling of regulator block output power that can occur in conventional PMU 102 as discussed above. The operation of an embodiment of the invention's PMU 202 will be further discussed below in relation to the timing diagrams in FIGS. 3A, 3B, and 3C.

Figure 3A:
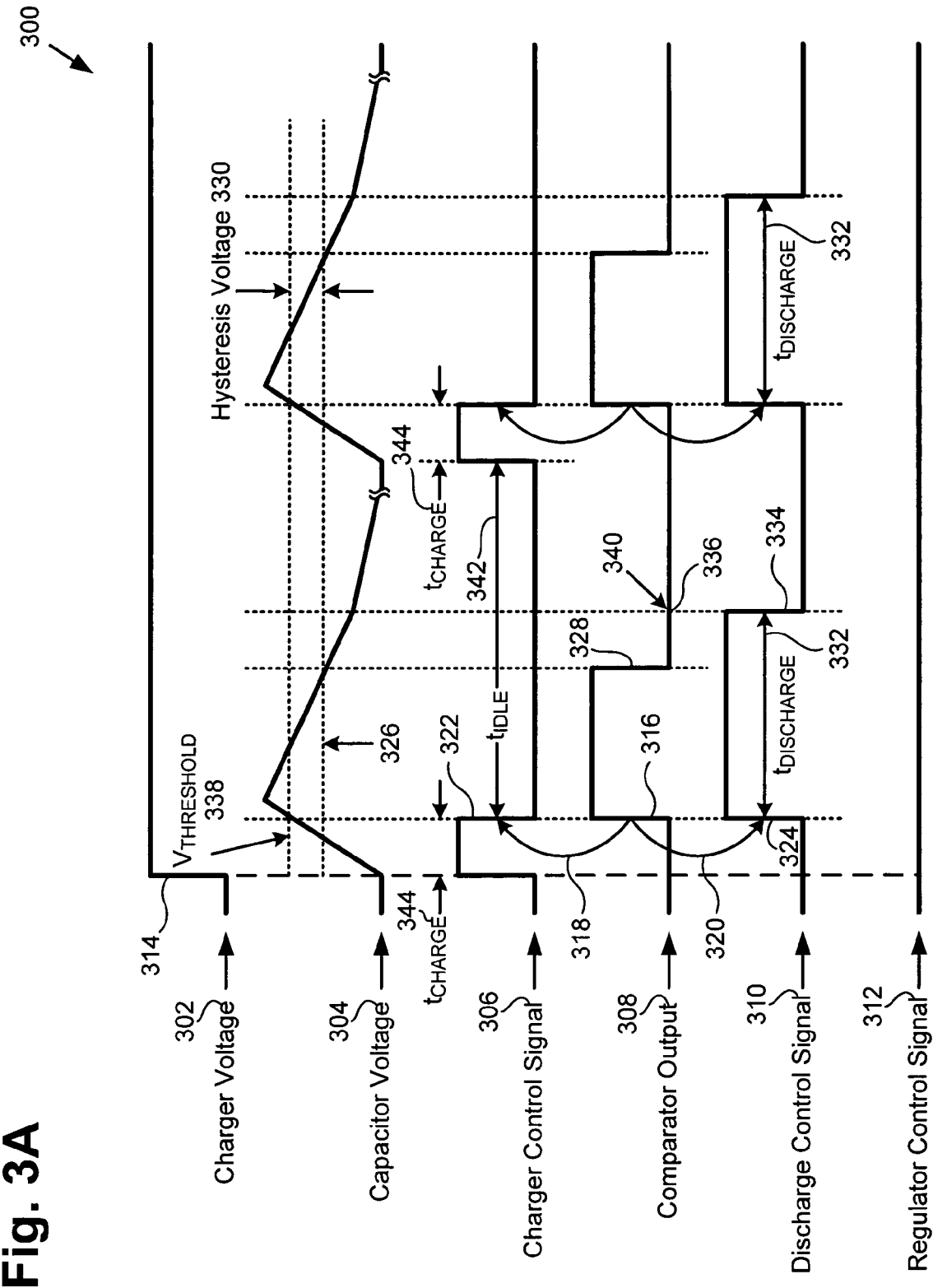
FIG. 3A shows an exemplary timing diagram for the exemplary PMU in FIG. 2 in accordance with one embodiment of the present invention.

FIG. 3A shows a timing diagram illustrating the operation of PMU 202 in FIG. 2 in accordance with one embodiment of the present invention. Timing diagram 300 illustrates the operation of PMU 202 when battery charger 210 is coupled to external power source 208 and is not coupled to battery 204. Thus, in timing diagram 300, battery 204 shown in FIG. 2 is not coupled to the battery input of PMU 202 at node 240. Timing diagram 300 includes charger voltage 302, capacitor voltage 304, charger control signal 306, comparator output 308, discharge control signal 310 and regulator control signal 312.

Charger voltage 302 corresponds to the voltage at node 226 (i.e. the charger input of PMU 202) provided by external power source 208, capacitor voltage 304 corresponds to the voltage across capacitor 206 at node 240, charger control signal 306 corresponds to the signal provided by battery detection controller 214 on line 230, comparator output 308 corresponds to the output of comparator 218 provided on line 234, discharge control signal 310 corresponds to the signal provided by battery detection controller 214 on line 232, and regulator control signal 312 corresponds to the signal provided by battery detection controller 214 on line 236.

The operation of PMU 202 in FIG. 2 will now be discussed with respective to timing diagram 300, wherein PMU 202 resides in an electronic device, such as a cellular phone, and battery 204 is not installed in the electronic device and, therefore, not coupled to battery charger 210. When external power source 208 is coupled to battery charger 210 at the charger input of PMU 202, charger voltage 302 at node 226 transitions from a low voltage level to a high voltage level at rising edge 314. Hereinafter, a transition from a low voltage level to a high voltage level is referred to as a "low-to-high" transition and a transition from a high voltage level to a low voltage level is referred to as a "high-to-low" transition in the present application.

Rising edge 314 of charger voltage 302 is detected by charger detect 212 and communicated to battery detection controller 214 via line 228 to indicate that external power source 208 is coupled to battery charger 210. In response to the low-to-high transition of charger voltage 302, battery detection controller 214 causes charger control signal 306 on line 230 to transition from low-to-high to turn on battery charger 210. When activated by charger control signal 306, battery charger 210 begins charging capacitor 206, which is coupled to node 240 (i.e. the battery input of PMU 202). When capacitor voltage 304 exceeds $V_{THRESHOLD}$ 338, which corresponds to $V_{THRESHOLD}$ 238 in FIG. 2, comparator output 308, which is coupled to an input of battery detection controller 214 via line 234, transitions from low-to-high at rising edge 316.

Battery detection controller 214 detects rising edge 316 of comparator output 308 and causes charger control signal 306 to transition from high-to-low (indicated by arrow 318), which causes battery charger 210 to turn off, and also causes discharge control signal 310 to transition from low-to-high (indicated by arrow 320) at rising edge 324. Rising edge 324 of discharge control signal 310 causes current sink 216 to turn on, thereby causing capacitor 206 to begin discharging. Current sink 216 is utilized in PMU 202 to enable capacitor 206 to be discharged quickly to determine if battery 204 is installed in the electronic device in which PMU 202 resides and coupled to the output of battery charger 210 at node 240.

When capacitor voltage 304 at the positive input of comparator 218 decreases to a value approximately equal to voltage level 326, which is the lower trigger voltage level of comparator 218, comparator output 308 transitions from high-to-low at falling edge 328. In comparator 218, hysteresis voltage 330 corresponds to the difference between $V_{THRESHOLD}$ 338 and voltage level 326. When the voltage at the positive input of comparator 218 increases to a value greater than $V_{THRESHOLD}$ 338, comparator output 308 transitions from low-to-high. The output of comparator output 308 will remain at the high voltage level until the voltage at the positive input of comparator 218 decreases to a value approximately equal to voltage level 326, which causes the output of comparator 218 to transition from high-to-low.

Discharge control signal 310 remains at a high voltage level for predetermined discharge time ($t_{DISCHARGE}$) 332, which can be selected to be a sufficiently long interval of time so as to ensure that capacitor 206 will be discharged to a voltage level lower than voltage level 326, i.e., the voltage level at which a decreasing voltage at the positive input of comparator 218 will cause comparator output 308 to transition from high-to-low, when battery 204 is not coupled to node 240. For example, $t_{DISCHARGE}$ 332 can be equal to approximately 50.0 milliseconds (ms). During $t_{DISCHARGE}$ 332, capacitor 206 can be discharged at a discharge current equal to, for example, approximately 1.0 mA. After $t_{DISCHARGE}$ 332 has expired, discharge control signal 310 transitions from high-to-low at falling edge 334, which causes current sink 216 to turn off.

When discharge control signal 310 transitions from high-to-low at falling edge 334, battery detection controller 214 can sample comparator output 308 (as indicated by arrow 340) at time 336. Comparator output 308 has a low voltage level at time 336, which indicates to battery detection controller 214 that a battery, such as battery 204, is not detected, i.e., not coupled to the output of battery charger 210 at node 240. When battery detection controller 214 does not detect a battery coupled to battery charger 210, it (i.e. battery detection controller 214) causes regulator control signal 312 to remain at a low voltage level, thereby causing regulator block 222 to remain turned off. After idle time ($t_{IDLE}$) 342 has expired, battery detection controller 214 can repeat the battery detection cycle discussed above by causing charger control signal 306 to transition from low-to-high, thereby causing battery charger 210 to turn on and begin charging capacitor 206. For example, $t_{IDLE}$ 342 can be equal to approximately 1.0 second. However, $t_{IDLE}$ 342 may also be less than or greater than 1.0 second.

Charger control signal 306 remains at a high voltage level until capacitor voltage 304 exceeds $V_{THRESHOLD}$ 338, which causes comparator output 308 to transition from low-to-high. Charge time ($t_{CHARGE}$) 344, which is the interval of time during which capacitor 206 is being charged by battery charger 210, can be selected to be long enough to allow capacitor 206 to be charged to a voltage level greater than $V_{THRESHOLD}$ 338. For example, $t_{CHARGE}$ 344 can be equal to approximately 15.0 ms. However, $t_{CHARGE}$ 344 may also be less than or greater than 15.0 ms. Thus, the battery detection cycle discussed above, which includes charging capacitor 206 to a voltage greater than $V_{THRESHOLD}$ 338, discharging capacitor 206 for an interval of time equal to $t_{DISHCARGE}$ 332, and sampling comparator output 308, can be repeated to determine if a battery, such as battery 204, is coupled to battery charger 210.

Thus, as discussed above, when an external power source is coupled to the charger input of PMU 202 and a battery is not detected at node 240 and, therefore, not coupled to the output of battery charger 210, battery detection controller 214 causes regulator block 222 to be turned off. As a result, the invention's PMU 202 advantageously avoids on/off cycling of the regulator block, which can occur in a conventional PMU 102 in FIG. 1, when an external power source is coupled to the PMU's battery charger and a battery is not coupled to the battery charger.

Figure 3B:
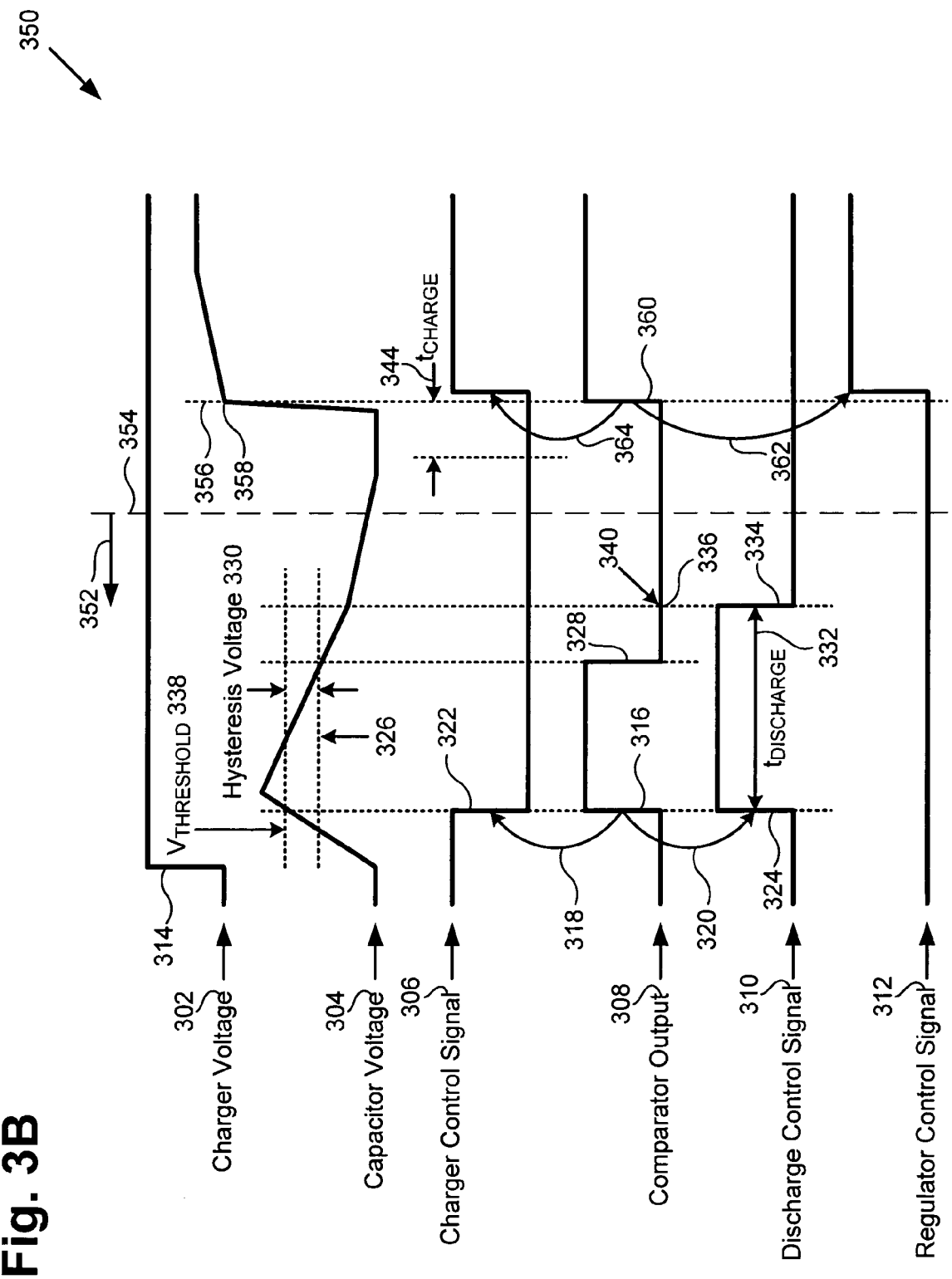
FIG. 3B shows an exemplary timing diagram for the exemplary PMU in FIG. 2 in accordance with one embodiment of the present invention.

FIG. 3B shows a timing diagram illustrating the operation of PMU 202 in FIG. 2 in accordance with one embodiment of the present invention. Timing diagram 350 illustrates the operation of PMU 202 when battery 204 is coupled to battery charger 210 while battery charger 210 is coupled to external power source 208, and where battery 204 has a battery voltage greater than $V_{THRESHOLD}$ 238. It is noted that the portion of timing diagram 350 indicated by arrow 352, which extends to the left of time line 354, is similar to timing diagram 300 in FIG. 3A and, therefore, will not be discussed in timing diagram 350. Charger voltage 302, capacitor voltage 304, charger control signal 306, comparator output 308, discharge control signal 310, regulator control signal 312, rising edges 314 and 316, arrows 318, 320 and 340, falling edges 322, 328, and 334, voltage level 326, hysteresis voltage 330, $t_{DISCHARGE}$ 332, time 336, $V_{THRESHOLD}$ 338, and $t_{CHARGE}$ 344 correspond to the same elements in timing diagram 300 in FIG. 3A and timing diagram 350 in FIG. 3B.

The operation of PMU 202 in FIG. 2 will now be discussed with respective to timing diagram 350. At time 356, battery 204 is coupled to the battery input of PMU 202 at node 240, where battery 204 has a battery voltage greater than $V_{THRESHOLD}$ 338. When battery 204 is coupled to node 240, capacitor voltage 304, which corresponds to the voltage coupled to the positive input of comparator 218 at node 240, rapidly increases to voltage level 358 at time 356. Since the battery voltage of battery 204 is greater than $V_{THRESHOLD}$ 338 at time 356, comparator output 308 transitions from low-to-high at leading edge 360.

Thus, since charger control signal 306 is at a low voltage level at time 356, the low-to-high transition of comparator output 308 at time 356 indicates to battery detection controller 214 that battery 204 has been coupled to the battery input of PMU 202 at node 240 and that the battery has a battery voltage greater than $V_{THRESHOLD}$ 338. Thus, when comparator output 308 transitions from low-to-high at time 356, battery detection controller 214 detects that battery 204 has been coupled to PMU 202 at node 240 and causes regulator control signal 312 to transition from low-to-high (as indicated by arrow 362), thereby turning on regulator block 222. When regulator block 222 is turned on by battery detection controller 214, regulator block 222 can provide output power 224 to the electrical circuits in the electronic device (not shown in any of the figures) in which PMU 202 resides. When comparator output 308 transitions from low-to-high at time 356, battery detection controller 214 also causes charger control signal 306 to transition from low-to-high (as indicated by arrow 364) so as to turn on battery charger 210 to charge battery 204.

Thus, in the invention's PMU 202, when an external power source, such as external power source 208 is coupled to a charger input of PMU 202 at node 226, regulator block 222 is only turned on by battery detection controller 214 when a battery, such as battery 204, is coupled to the battery input of PMU 202 at node 240 and the battery has a battery voltage greater than a threshold voltage (i.e. $V_{THRESHOLD}$ 238).

Figure 3C:
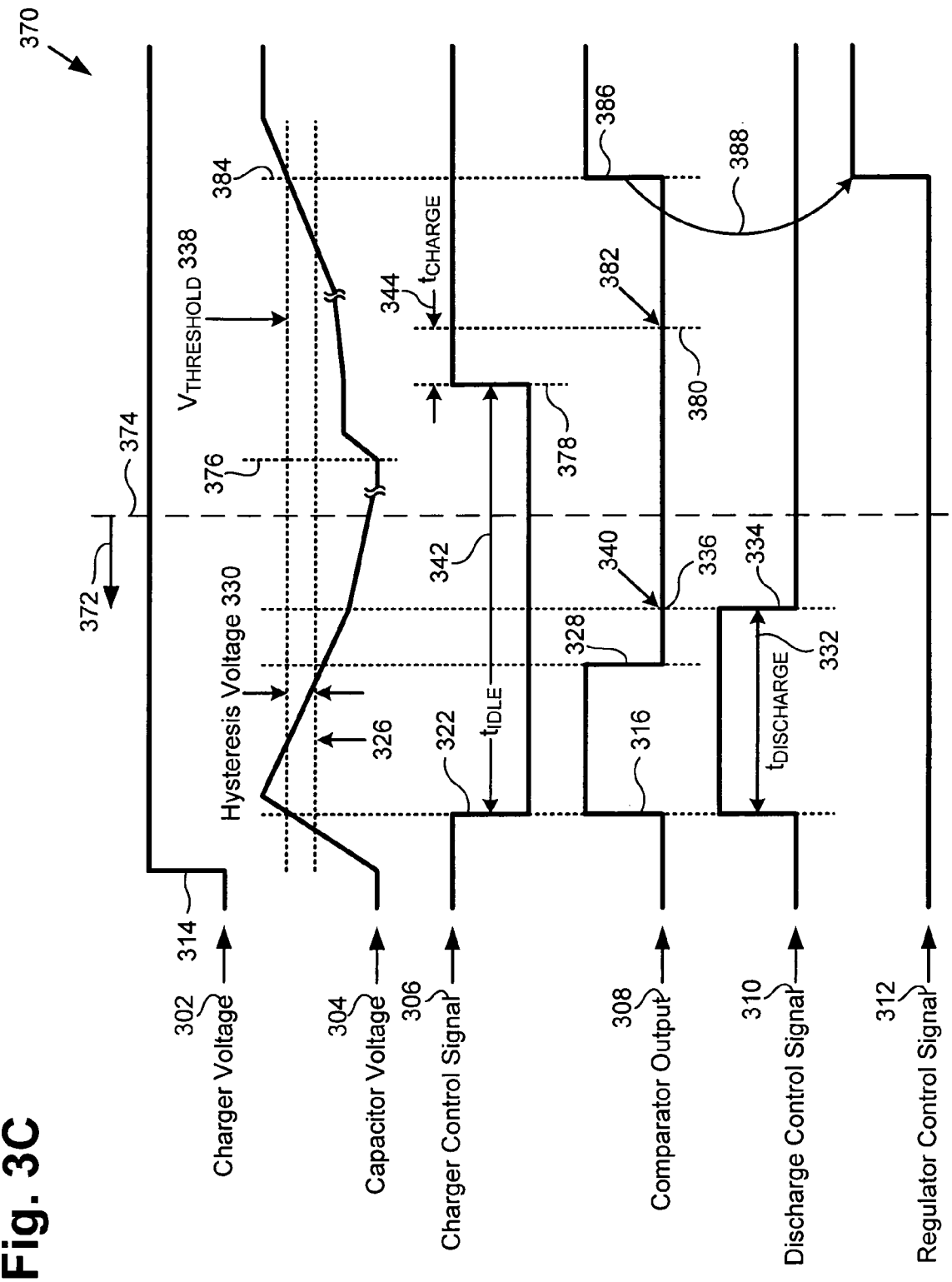
FIG. 3C shows an exemplary timing diagram for the exemplary PMU in FIG. 2 in accordance with one embodiment of the present invention.

FIG. 3C shows a timing diagram illustrating the operation of PMU 202 in FIG. 2 in accordance with one embodiment of the present invention. In FIG. 3, timing diagram 370 illustrates the operation of PMU 202 when battery 204 is coupled to battery charger 210 while battery charger 210 is coupled to external power source 208, and where battery 204 has a battery voltage that is charged to a voltage level less than $V_{THRESHOLD}$ 238. It is noted that the portion of timing diagram 370 indicated by arrow 372, which extends to the left of time line 374, is similar to timing diagram 300 in FIG. 3A and, therefore, will not be discussed in timing diagram 370. Charger voltage 302, capacitor voltage 304, charger control signal 306, comparator output 308, discharge control signal 310, regulator control signal 312, rising edges 314 and 316, arrow 340, falling edges 322, 328, and 334, voltage level 326, hysteresis voltage 330, $t_{DISCHARGE}$ 332, time 336, $V_{THRESHOLD}$ 338, $t_{IDLE}$ 342, and $t_{CHARGE}$ 344 correspond to the same elements in timing diagram 300 in FIG. 3A and timing diagram 370 in FIG. 3C.

The operation of PMU 202 in FIG. 2 will now be discussed with respective to timing diagram 370. At time 376, battery 204 is coupled to the battery input of PMU 202 at node 240 while external power source 208 is coupled to the charger input of PMU 202, where battery 204 has a battery voltage that is less than $V_{THRESHOLD}$ 338. Since the battery voltage of battery 204 is less than $V_{THRESHOLD}$ 338 when battery 204 is coupled to node 240, comparator output 308 does not transition from low-to-high at time 376. At end of $t_{IDLE}$ 342 at time 378, another battery detection cycle begins in PMU 202, wherein charger control signal 306 transitions from low-to-high to turn on battery charger 210 so as to charge capacitor 206 at node 240. After $t_{CHARGE}$ 344 has expired, comparator output 308 is sampled by battery detection controller 214 at time 380, as indicated by arrow 382.

At time 380, comparator output 308 is at a low voltage level, which indicates to battery detection controller 214 that a battery having a battery voltage less than $V_{THRESHOLD}$ 338 is coupled to node 240 of PMU 202. For example, if a battery was not coupled to node 240, capacitor 206 would have charged to voltage greater than $V_{THRESHOLD}$ 338 at the end of $t_{CHARGE}$ 344, which would have caused comparator output 308 to transition from low-to-high at time 380. For example, if a battery having a battery voltage greater than $V_{THRESHOLD}$ 338 was coupled to node 240, comparator output 308 would have already transitions from low-to-high at time 380. When battery detection controller detects that a battery having a battery voltage less $V_{THRESHOLD}$ 338 is coupled to node 240 of PMU 202 at time 380, battery detection controller 214 leaves battery charger 210 turned on so as to charge battery 204 at a trickle charging rate.

At time 384, when battery 204 has been charged to a battery voltage that is greater than $V_{THRESHOLD}$ 338, comparator output 308 transitions from low-to-high at rising edge 386. As a result, battery detection controller 214 causes regulator control signal 312 to transition from low-to-high (indicated by arrow 388) so as to turn on regulator block 222. As discussed above, when regulator block 222 is turned on by battery detection controller 214, regulator block 222 can provide output power 224 to electrical circuits in the electronic device (not shown in any of the figures) in which PMU 202 resides.

Thus, as discussed above, the present invention provides a PMU (power management unit) that can detect whether or not a battery is coupled to the PMU's battery charger at the battery input of the PMU when the charger input of the PMU is coupled to an external power source. If a battery is not coupled to the battery charger and an external power source is coupled to the PMU, a battery detection controller in the PMU can prevent the PMU from providing output power to the electronic device in which the PMU resides. As a result, the invention's PMU advantageously avoids undesirable on/off regular power cycling that can occur in a conventional PMU.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

Thus, a power management unit with battery detection has been described.

The invention claimed is:

1. A power management unit residing in an electronic device, said power management unit comprising:
    a battery detection controller coupled to a battery charger and a regulator block, said regulator block being capable of providing power only to said electronic device, said regulator block not providing power to said battery charger;
    said battery detection controller being configured to turn off said regulator block when said battery charger is coupled to an external power source and is not coupled to a battery of said electronic device.

2. The power management unit of claim 1, wherein said battery detection controller is further configured to turn on said regulator block when said battery charger is coupled to said external power source and is coupled to said battery if said battery has a battery voltage greater than a threshold voltage.

3. The power management unit of claim 1, wherein said battery detection controller is further configured to turn off said regulator block when said battery charger is coupled to said external power source and is coupled to said battery if said battery has a battery voltage less than a threshold voltage.

4. The power management unit of claim 3, wherein said battery detection controller is further configured to turn on said regulator block after said battery has been charged to said battery voltage greater than said threshold voltage.

5. The power management unit of claim 1, wherein said battery detection controller causes a capacitor coupled to said battery charger battery to be discharged for a predetermined time interval to determine if said battery charger is coupled to said battery.

6. The power management unit of claim 5 further comprising a comparator, wherein said battery detection controller determines that said battery charger is not coupled to said battery when an output of said comparator is at a low voltage level after said capacitor has been discharged for said predetermined time interval.

7. The power management unit of claim 5 further comprising a current sink, wherein said battery detection controller causes said current sink to discharge said capacitor for said predetermined time interval.

8. A method for controlling a regulator block in a power management unit residing in an electronic device, said regulator block being capable of providing power only to said electronic device, said regulator block not providing power to a battery charger in said power management unit, said method comprising steps of:
    detecting if an external power source is coupled to said battery charger in said power management unit;
    determining if said battery charger is coupled to a battery of said electronic device;
    turning off said regulator block if said battery charger is coupled to said external power source and is not coupled to said battery of said electronic device.

9. The method of claim 8 further comprising a step of turning on said regulator block if said battery charger is coupled to said external power source and is coupled to said battery if said battery has a battery voltage greater than a threshold voltage.

10. The method of claim 8 further comprising a step of turning off said regulator block when said battery charger is coupled to said external power source and is coupled to said battery if said battery has a battery voltage less than a threshold voltage.

11. The method of claim 10 further comprising a step of turning on said regulator block after charging said battery to a battery voltage greater than said threshold voltage.

12. The method of claim 8, wherein said determining step is performed by a battery detection controller in said power management unit, wherein said battery detection controller controls said regulator block.

13. The method of claim 8, wherein said determining step comprises the steps of:
   discharging for a predetermined time interval a capacitor coupled to said battery charger;
   sampling an output of a comparator in said power management unit;
   determining that said battery charger is not coupled to said battery if said output of said comparator is at a low voltage level.

14. The method of claim 13, wherein said sampling step is performed by a battery detection controller in said power management unit.

15. A power management unit residing in an electronic device, said power management unit comprising:
   a battery detection controller coupled to a battery charger and a regulator block, said regulator block being capable of providing power only to said electronic device, said regulator block not providing power to said battery charger;
   said battery detection controller being configured to turn off said regulator block when said battery charger is coupled to an external power source and is not coupled to a battery of said electronic device;
   said battery detection controller being further configured to turn on said regulator block when said battery charger is coupled to said external power source and is coupled to said battery if a battery voltage of said battery is greater than a threshold voltage.

16. The power management unit of claim 15, wherein said battery detection controller is further configured to turn off said regulator block when said battery charger is coupled to said external power source and is coupled to said battery if said battery voltage of said battery is less than said threshold voltage.

17. The power management unit of claim 15 further comprising a comparator having an output coupled to an input of said battery detection, a first input coupled to said threshold voltage, and a second input coupled to an output of said battery charger.

18. The power management unit of claim 17, wherein said battery detection controller is further configured to turn off said regulator block if said output of said comparator is at a low voltage level after a capacitor coupled to said second input of said comparator has been discharged for a predetermined time interval.

19. The power management unit of claim 17, wherein said second input of said comparator is coupled to a current sink, wherein said current sink is configured to discharge a capacitor coupled to said output of said battery charger for a predetermined time interval when said current sink is turned on by said battery detection controller.

20. The power management unit of claim 15, wherein said battery detection controller is further configured to turn on said battery charger when said battery detection controller detects that said external power source is coupled to said battery charger.

21. An electronic device comprising:
   a battery detection controller coupled to a battery charger;
   said battery detection controller providing a charger control signal to said battery charger;
   said charger control signal causing said battery charger to provide a charging current during a predetermined charge time so as to determine whether a battery is coupled to said battery charger;
   said charger control signal dependent on charging a capacitor to a voltage at a common node greater than a threshold voltage, discharging said capacitor through a current sink coupled directly to a ground voltage for a predetermined discharge time, and sampling a difference of said voltage and said threshold voltage.

22. The electronic device of claim 21 wherein said capacitor is coupled to and shares said common node with said battery.

23. The electronic device of claim 22 wherein said voltage at said common node is sampled by said battery detection controller.

24. The electronic device of claim 22 wherein said voltage at said common node exceeds said threshold voltage during said pre-determined charge time if said battery is not coupled to said battery charger.

25. The electronic device of claim 22 wherein said voltage at said common node does not exceed said threshold voltage during said pre-determined charge time if said battery is coupled to said battery charger.

26. The electronic device of claim 22 wherein a comparator coupled to said common node is utilized to compare said voltage at said common node to said threshold voltage.

27. The electronic device of claim 26 wherein an output of said comparator is coupled to said battery detection controller.

28. The electronic device of claim 27 wherein said battery detection controller determines whether said battery is coupled to said battery charger based on said output of said comparator.

29. The electronic device of claim 21 wherein said battery detection controller is part of a power management unit in said electronic device.

30. The electronic device of claim 21 wherein said battery charger is part of a power management unit in said electronic device.

31. The electronic device of claim 21 wherein said predetermined charge time is greater than approximately 15.0 ms.

32. The electronic device of claim 21 wherein said common node corresponds to an output node of said battery.

33. The electronic device of claim 32 wherein a voltage at said output node exceeds a threshold voltage during said pre-determined charge time if said battery is not coupled to said battery charger.

34. The electronic device of claim 32 wherein a voltage at said output node does not exceed a threshold voltage during said pre-determined charge time if said battery is coupled to said battery charger.

35. The electronic device of claim 32 wherein a comparator coupled to said output node is utilized to compare said voltage at said output node to said threshold voltage.

36. The electronic device of claim 35 wherein an output of said comparator is coupled to said battery detection controller.

37. The electronic device of claim 36 wherein said battery detection controller determines whether said battery is coupled to said battery charger based on said output of said comparator.

38. The electronic device of claim 32 wherein said battery detection controller is part of a power management unit in said electronic device.

39. The electronic device of claim 32 wherein said battery charger is part of a power management unit in said electronic device.

40. A method for determining whether a battery is coupled to a battery charger in an electronic device, said method comprising:

causing said battery charger to provide a charging current during a predetermined charge time to a common node shared by said battery and a capacitor, thereby charging said voltage at said common node greater than a threshold voltage;

causing said battery charger to discharge said capacitor through a current sink coupled directly to a ground voltage for a predetermined discharge time;

sampling a difference of said voltage at said common node and said threshold voltage to determine whether said battery is coupled to said battery charger.

41. The method of claim 40 wherein a battery detection controller causes said battery charger to provide said charging current during said pre-determined charge time.

42. The method of claim 40 wherein said sampling said voltage comprises determining whether said voltage at said common node exceeds said threshold voltage during said pre-determined charge time.

43. The method of claim 42 wherein said voltage at said common node exceeds said threshold voltage during said pre-determined charge time if said battery is not coupled to said battery charger.

44. The method of claim 42 wherein said voltage at said common node does not exceed said threshold voltage during said pre-determined charge time if said battery is coupled to said battery charger.

45. The method of claim 40 wherein said measuring said voltage comprises using a comparator to determine whether said voltage at said common node exceeds a threshold voltage.

46. The electronic device of claim 45 wherein an output of said comparator is coupled to a battery detection controller in said electronic device.

47. The electronic device of claim 46 wherein said battery detection controller determines whether said battery is coupled to said battery charger based on said output of said comparator.

48. The method of claim 40 wherein said predetermined charge time is greater than approximately 15.0 ms.

* * * * *